(12) United States Patent
Cragun (10) Patent No.: US 6,785,680 B1
(45) Date of Patent: Aug. 31, 2004

(54) METHOD AND APPARATUS FOR PROVIDING INDIVIDUALIZED CLIENT DATA FROM A SERVICE PROVIDER TO A PORTABLE DIGITAL DEVICE OF A CLIENT

(75) Inventor: Brian John Cragun, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 383 days.

(21) Appl. No.: 09/603,027

(22) Filed: Jun. 26, 2000

(51) Int. Cl.[7] ............................................. G06F 17/30
(52) U.S. Cl. ......................... 707/10; 707/200; 707/203; 342/457; 434/238
(58) Field of Search .......................... 707/10, 200, 203, 707/205; 709/203, 224; 705/11; 340/309.15; 342/457; 434/238

(56) References Cited

U.S. PATENT DOCUMENTS

| | | | |
|---|---|---|---|
| 5,493,692 A | | 2/1996 | Theimer et al. ............ 455/26.1 |
| 5,539,665 A | * | 7/1996 | Lamming et al. ........... 709/224 |
| 5,790,974 A | | 8/1998 | Tognazzini ................. 701/204 |
| 5,796,827 A | | 8/1998 | Coppersmith et al. ......... 380/9 |
| 5,826,240 A | * | 10/1998 | Brockman et al. ............ 705/11 |
| 5,929,747 A | * | 7/1999 | Rosenblatt et al. ..... 340/309.15 |
| 5,982,520 A | | 11/1999 | Weiser et al. ................ 359/172 |
| 6,042,383 A | * | 3/2000 | Herron ........................ 434/238 |
| 6,199,099 B1 | * | 3/2001 | Gershman et al. .......... 709/203 |
| 6,259,405 B1 | * | 7/2001 | Stewart et al. ............... 342/457 |
| 6,385,591 B1 | * | 5/2002 | Mankoff ....................... 705/14 |
| 6,457,062 B1 | * | 9/2002 | Pivowar et al. .............. 709/248 |

FOREIGN PATENT DOCUMENTS

| | | | | |
|---|---|---|---|---|
| EP | 0917077 A2 | * | 5/1999 | ............ G06F/17/60 |
| WO | WO 96/27171 | * | 9/1996 | ............. G07C/5/00 |

* cited by examiner

*Primary Examiner*—Thuy N. Pardo
(74) *Attorney, Agent, or Firm*—Roy W. Truelson (57) ABSTRACT

A service provider generates digital records of calendar events with respect to its clients using its own data, and automatically transfers these records to portable digital devices of the clients. Preferably, the service provider maintains a computer system or terminal at the point of personal contact with the client, which is also used to track service provider operations. The provider's computer system automatically generates an event record in a format for use by the client, from data in the computer system used to track service provider operations. Preferably, the service provider maintains a list of clients and their associated portable digital device interface type. The provider's computer system generates an appropriate calendar event, and formats and transmits it according to the client's interface type. The service provider may include with the calendar event any associated data which might be useful to the client, such as the telephone number of the service provider, hours of service, instructions for something the client should do, etc. In one example, the service provider is a public library, and event records are borrowed item information. In another example, the service provider is a health care provider, and event records are appointments for health care services. The present invention thus achieves greater integration of relatively large computer systems with portable digital devices.

19 Claims, 7 Drawing Sheets

701 {
HEADER :
X_X__XX__XX__
XX__XX__XX
<PASSWORD>
X__XXX__
}

702 {
DATE :      <msg_date>
TIME :      <msg_time>
}

703 {
TEXT :
The following item is due for return to
the Rochester Public Library    <due_date>
<book_title>

Library hours are  9:00 am - 8:00 pm Mon - Thur
                   9:00 am - 6:00 pm Fri - Sat For information, call the library at
507 - 123 - 4567

<Upcoming_event_text>
}

704 {
END MESSAGE
XXX__X_XXX
}

FIG. 7

METHOD AND APPARATUS FOR PROVIDING INDIVIDUALIZED CLIENT DATA FROM A SERVICE PROVIDER TO A PORTABLE DIGITAL DEVICE OF A CLIENT

FIELD OF THE INVENTION

The present invention relates to digital data processing devices, and in particular to the integration of data used in computer systems and computer system networks with portable digital devices.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Early computer systems were very expensive and difficult to use, capable of being programmed and manipulated by only a handful of highly-educated specialists. The cost of operating such computers was correspondingly high, and they were therefore used for only the most essential tasks. The dynamic which has driven the information revolution is the sustained reduction in the cost of computing. Thus, information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The declining prices and expanding capabilities of modern computers cause them to be applied to an ever increasing variety of applications. For some years now, inexpensive "personal computers" have been available for personal use at home or for the use of a single individual at a place of business. Increased miniaturization has made it possible to design portable "laptop" computers, having essentially the same functions as desktop personal computers.

In recent years, a family of portable digital devices known as palm-tops or personal digital assistants (PDA), have been introduced. Generally, these devices are digital computing devices, but have somewhat more limited function than the laptop or desktop personal computers. A PDA device typically contains a very restricted keyboard for data entry when compared with the laptop or desktop. I.e., the keys may be very small and/or limited in number, so that touch typing is not practical. This is a design sacrifice which is made to reduce the size of the device to something than will fit in the palm of one hand.

PDA devices are commonly provided with an interface for receiving data from another digital device, such as a desktop personal computer. It is anticipated that a PDA functions as a limited portable version of the user's primary (i.e., desktop) computer system, and therefore a means should be provided for periodically transferring data from the desktop to the PDA. Since direct manual data entry using the keys or buttons of the PDA is somewhat difficult when compared with the conventional desktop computer, such an interface has the secondary purpose of providing an easier, alternative way to get data into the PDA.

One common use to which PDAs are put is the recording of calendar events. As used herein, "calendar events" means any data item which is associated with a date and/or time, and thus might typically be stored in a calendar type application. Examples of such calendar events include, but are not necessarily limited to, things a person might be doing at a particular date and time (meetings, appointments, etc), reminders to be given a person at a particular date and time ("project X due today", "call your broker today", etc), or general date-related annotations ("Mary's birthday today", etc). Conventionally, calendar events are entered into a PDA device in one of two ways. The events may be entered manually, or the events may be downloaded from a user's desktop, usually as a copy of event recorded in a calendar application on the user's desktop system.

In general, each PDA functions as a self-contained miniature computer system. Except for downloading information from the user's desktop, the PDA typically has little interaction with other computer systems. Specifically, the user typically makes all calendar entries himself, whether directly or by downloading from the desktop. This limits the usefulness of the PDA. Due to the burden of entering information, the user often does not enter potentially useful information into the PDA. For example, some calendar events may not be entered at all because the user feels that he will remember them without the reminder, or that they are of insufficient importance. Furthermore, information associated with calendar events may be abbreviated to ease the burden of entry. For example, a user may enter the date and time of a doctor's appointment, but may omit the doctor's telephone number, or specific instructions for a medical test, such as fasting or medication. This associated information may well be useful if it is necessary to change the appointment, or to remember the pre-appointment instructions.

While conventional methods of using calendar functions in portable digital devices, such as PDAs, provide some value to the user, they fail to take full advantage of the potential of today's technology. An unrecognized need exists for greater integration of information contained in computer system of service providers with PDAs of their clients

SUMMARY OF THE INVENTION

A service provider generates digital records of calendar events with respect to its clients from its own information, and automatically transfers these records to portable digital devices of the clients, obviating the need for the clients to enter the information by other means.

In the preferred embodiment, the service provider maintains a computer system or terminal at the point of personal contact with the client, such as an appointment desk, checkout desk, sales desk or the like. The computer system is used to track service provider operations. The service provider's computer system automatically generates electronic calendar event records in formats for use by the service provider's clients, from data in the computer system used to track service provider operations. In the preferred embodiment, the service provider maintains a list of clients and their associated portable digital device interface type in a computer system. In an alternative embodiment, the computer system prompts an operator for interface information at the time the event record is generated. The service provider's computer system generates an appropriate calendar event records, and formats and transmits it according to the client's interface type. The service provider may include with a calendar event record any associated data which might be useful to the client, such as the telephone number of the service provider, hours of service, instructions for something the client should do, general advertising of additional services available, etc. The service provider may provide multiple calendar event records with respect to the same event, each record containing different information or serving a different purpose (e.g., a displayable entry record for an electronic calendar, and a reminder entry record to be presented at a particular time). A client without a portable digital device may be provided with calendar event data by alternative means, e.g., by sending an e-mail message over the Internet.

In a first example, the service provider is a public library. When the client wishes to check out a book, checkout information is entered into the library's computer system as in conventional library tracking systems. This checkout information includes, for example, the item being checked out and the name of the client checking out the item. The library computer system may generate a due date, e.g., by accessing a database to determine a length of time the item may be borrowed, and performing the necessary arithmetic to derive a due date from today's date and the length of time of borrowing. With this and possibly other information available to the computer system, the system automatically generates a calendar event record and transmits the record to the client's portable digital device.

In a second example, the service provider is a health care provider, such as a medical doctor, dentist, chiropractor, or the like. Upon visiting the health care provider, the client makes an appointment for a subsequent visit. The subsequent visit may include medical procedures or tests having special pre-appointment instructions. Upon making the appointment, the health care provider accesses its own database to generate a calendar event record for the client, and transmits the record to the clients portable digital device. Such a record may optionally include, e.g., pre-appointment instructions for the next visit, such as the need to take medication, fast, etc., a telephone number for questions or for changes to the appointment, and other useful information.

The present invention thus achieves greater integration of relatively large computer systems with portable digital devices. It makes portable digital devices more usable by automatically generating event data, and does so from data which is, in general, already available in electronic form in the larger computer system of a service provider. Thus, neither the service provider nor the client is overly burdened with generating calendar event records and associated useful information.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
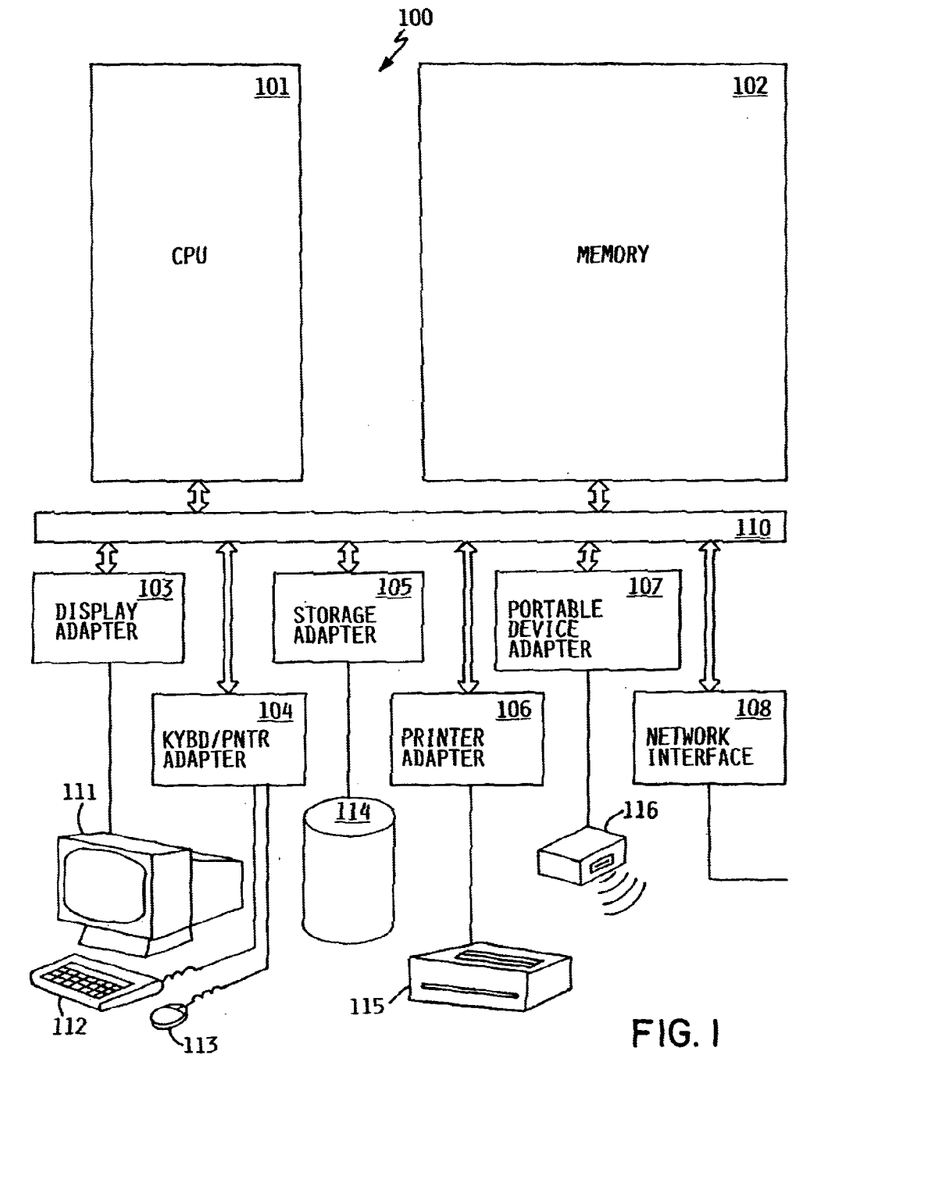
FIG. 1 is a high-level block diagram of a service provider computer system, according to the preferred embodiment of the present invention.

Referring to the Drawing, wherein like numbers denote like parts throughout the several views, FIG. 1 is a high-level block diagram of a typical service provider computer system 100, according to the preferred embodiment. Computer system 100 includes CPU 101, main memory 102, various device adapters and interfaces 103–108, and communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity, it being understood that memory is often arranged in a hierarchy of caches and other memory devices. Communications bus 110 supports transfer of data, commands and other information between different devices; while shown in simplified form as a single bus, it may be structured as multiple buses, and may be arranged in a hierarchical form. Display adapter 103 supports video display 111, which is typically a cathode-ray tube display, although other display technologies may be used. Keyboard/pointer adapter 104 supports keyboard 112 and pointing device 113, depicted as a mouse, it being understood that other forms of input devices could be used. Storage adapter 105 supports one or more data storage devices 114, which are typically rotating magnetic hard disk drives, although other data storage devices could be used. Printer adapter 106 supports printer 115. Network interface 108 provides a physical interface to a computer network, such as the Internet, or a local area network. System 100 might alternatively be connected to a larger "mainframe" computer system through a mainframe terminal channel interface.

Portable device adapter 107 supports an interface 116 to portable digital devices. In the preferred embodiment, interface 116 includes an infrared transmitter for transmitting data on an infrared frequency to a portable digital device in close proximity to the transmitter. However, interface 116 could take any of various forms. For example, interface 116 could also be a data coupling into which a mating coupling of a portable digital device is plugged; or a visible light encoded transmitter; or a device which writes data to a nonvolatile removable storage from the portable digital device. Interface may alternatively be a radio frequency transmitter or other form of transmitter having wider range than a typical infrared transmitter. In one embodiment, interface 116 could be a telephonic interface utilizing a telephone network for transmission to a portable digital device having cellular telephone reception capability. Interface 116 could even be some more exotic form of interface, such as transmission through the human body as a medium, or any interface hereafter developed Finally, interface 116 could be a conglomeration of multiple types of interfaces for different types of portable digital devices, an appropriate interface being chosen depending on the type of portable digital device of the client.

The representation of FIG. 1 is intended as an exemplary simplified representation, it being understood that many variations in system configuration are possible in addition to those mentioned here. The number and type of attached devices may vary considerably. Computer system 100 may be any of various models of single-user computer systems known as "personal computers". Computer system 100 may also be a larger multi-user system such as an IBM Enterprise system or an IBM AS/400 system. While a single interactive display, keyboard and pointing device are shown in FIG. 1, such a multiuser system may support the attachment of multiple terminals, each having a display and input means. Such multiple terminals may have their own processors and memory, so that various functions could be distributed between the processor of the mainframe computer system and the processors of the terminals. For example, multiple interactive workstations could be attached to a mainframe computer system, the mainframe storing a database of service provider and client data, while appointments or other calendar data are entered through the interactive workstations. Alternatively, the present invention could be implemented using a client-server computing model in which a central server or servers of the service provider store data or perform certain tasks on behalf of the service provider's requesting terminals which act as clients (not to be confused with clients of the service provider). The present invention should therefore not be construed as limited to any particular type or configuration of computer system of the service provider.

Figure 2:
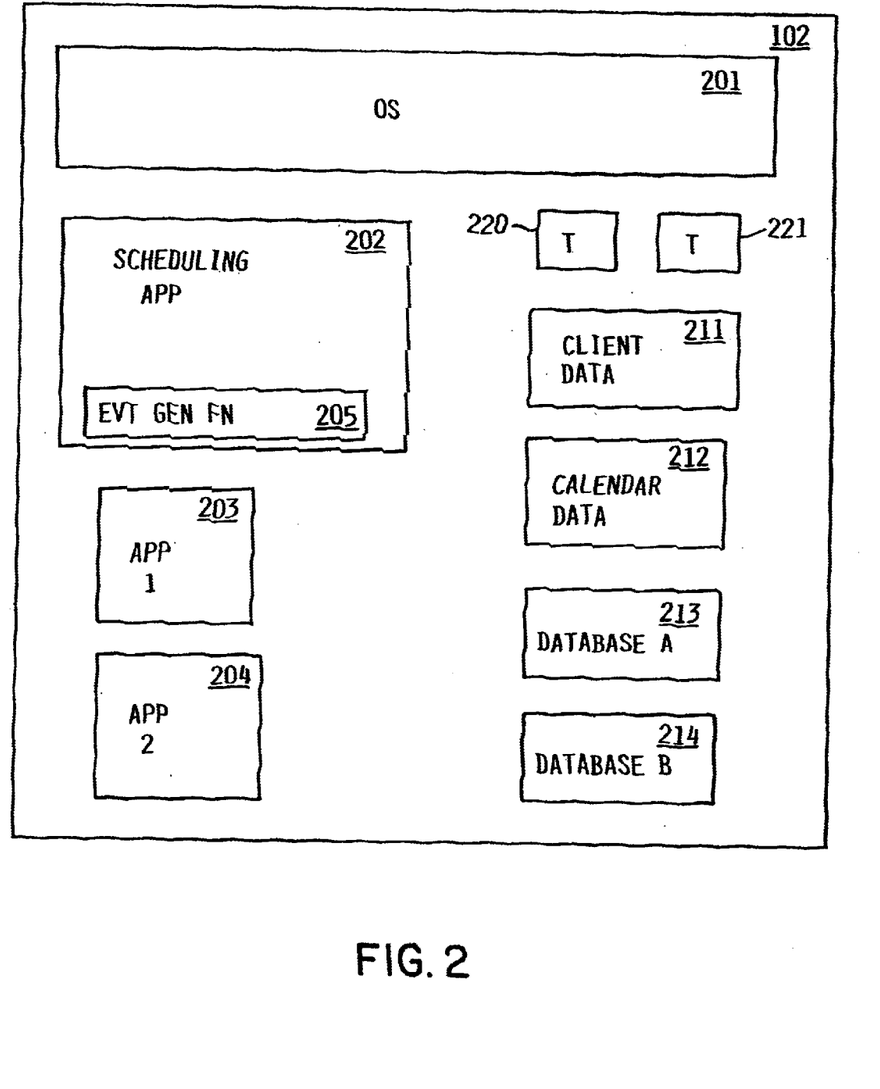
FIG. 2 is a conceptual illustration of the major software components of the service provider computer system, according to the preferred embodiment.

FIG. 2 is a conceptual illustration of the major software components of service provider computer system 100 in memory 102. Operating system 201 provides various low-level software functions, such as device interfaces, management of memory pages, management of windowing interfaces, management of multiple tasks, etc. as is well-known in the art. In addition to operating system 201, memory 102 contains scheduling application 202, and may contain various other application programs 203–204. These applications may include, e.g., word processing, spreadsheet, electronic calendar, accounting, graphics, or any of thousands of other possible applications. Applications 202–204 utilize data contained in database files 211–214.

While a certain number of application programs, files or other entities are shown in FIG. 2, it will be understood that these are shown for purposes of illustration only, and that the actual number and type of such entities may vary. Additionally, while the software components of FIG. 2 are shown conceptually as residing in memory, it will be understood that in general the memory of a computer system will be too small to hold all programs and data simultaneously, and that information is typically stored in data storage 114, comprising one or more mass storage devices such as rotating magnetic disk drives, and that the information is paged into memory by the operating system as required.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as storage device 114 and memory 102.

Of particular interest herein is scheduling application 202, which is preferably an interactive application computer program for scheduling calendar events germane to the service provider's operations. The type of calendar event will vary depending on the type of service provider. In a first example, wherein the service provider is a public library, a common form of calendar event relates to due dates and reminder notices for books and other articles which are checked out of the library. In a second example, wherein the service provider is a health care provider, a common form of calendar event is an appointment for a patient (a client) to meet one of the provider's personnel for examination, testing, procedures, and the like.

Calendar data 212 is a file or series of files (a database) containing information about calendar events. Scheduling application 202 uses this data, and may display it; search it for events of a certain type, for open time periods, and the like; edit it by creating, modifying and removing calendar events; and may contain more advanced functions such as generating statistical summary data from calendar data. Scheduling application 202 may use other data contained in databases 213, 214 designated generically as database A and database B, or in client database 211. Client database 211 contains entries corresponding to clients of the service provider, each entry containing information about a particular client. This would include obvious identifying information such as name, address, telephone number, and so forth, and may include additional information depending on the service provider's business. For example, a health care provider may have detailed information in the client database entries about the client's age, medical statistics, previous health history, health insurance, known medications and allergies, and numerous other matters. In accordance with the preferred embodiment, client database 211 further contains information for customizing an automatically generated event record for the client's portable digital device 303, as further described herein.

In the preferred embodiment, memory 102 further includes one or more event record templates 220–221, which are used to generate electronic event records for clients, as further described herein. While two templates are shown in FIG. 2 by way of example, the number of templates could vary. Templates will hereinafter be referred to generically by reference number 220.

In the preferred embodiment, scheduling application 202 includes calendar event data generation function 205. Event generation function 205 accesses calendar data 212 to automatically generate an electronic record of a calendar event formatted according to a template 220, and causes this record to be transmitted to the portable digital device of a client. Event generation function 205 may additionally access data in client database 211, or in other databases 213, 214, as more fully described herein.

It will be appreciated that some form of scheduling application and associated data is already used by many service providers, and considered a necessary part of the service provider's operations. Therefore, the basic applications and databases required for supporting the generation of calendar event data and transmission to client portable digital devices is already in place. In general, the generation of calendar event data for client portable devices is performed automatically, requiring little or no additional manual entry on the part of service provider personnel.

Figure 3:
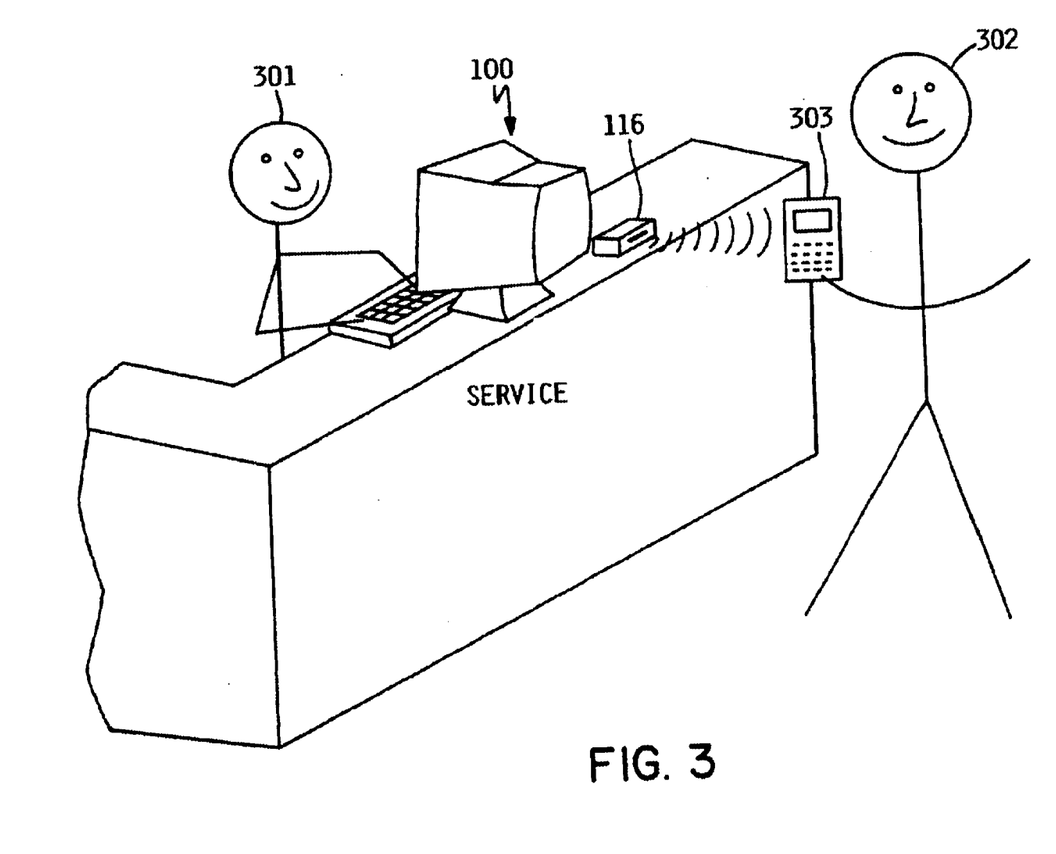
FIG. 3 illustrates the use of an automatic calendar event generation mechanism in conjunction with a personal interaction between a service provider agent and a client of the service provider, according to the preferred embodiment.

This use is illustrated in FIG. 3. Preferably, a personal interaction takes place between a service provider or employee or agent of a service provider 301 (herein referred to generically as "service provider agent" and a client 302, the client having a portable digital device 303 for recording, among other things, calendar events. The client 302 requests some service of the service provider which requires the scheduling of a calendar event. Service provider agent 301 responds by interactively entering information concerning the event in the computer system 100 of service provider, using scheduling application 202. Information may be entered manually by keyboard, pointing device, or the like, or may be entered by more automatic means, such as reading a magnetic stripe, bar code, or other data of a library card or a book to be checked out. The service provider may, in fact, have multiple agents for entering calendar data from multiple computer system terminals, all of which are in communication with a common database.

Upon entering the required data to create a calendar event in computer system 100, which must in any case be performed by agent 301 in support of service provider operations, agent 301 is given the option of transmitting an electronic record of the calendar event to the portable digital device 303 of the client 302. Agent 301 invokes the appropriate option, and event generation function 205 automatically generates an electronic record in response thereto, accessing data in calendar database 212, client database 211, and/or other databases 213, 214, as necessary to generate the calendar event record. This record is then automatically transmitted via transmitter 116 to portable digital device 303. Portable digital device 303 receives and stores the information, acting on it in the conventional manner appropriately to the type of event as if the event had been entered by the user. I.e., if the event is a reminder set for a particular date and time, the portable digital device will remind the client by beeping, displaying, or other appropriate means at the established time; if the event is an appointment, the data will be entered in the client's appointment calendar so that the client may view it on demand; etc.

Portable digital device 303 could be any digital device which is portable and which can be used for recording calendar events. Preferably, portable digital device is any of various simplified computer systems known as "palm-tops" or PDAs. However, by way of example and not limitation, portable digital device 303 could also be a lap-top computer system having more complete function than the typical palm-top or PDA. Furthermore, portable digital device 303 could be a telephonic device such as a cell phone which has, in addition to conventional telephonic functions, the capability to record calendar events as described herein.

Figure 4:
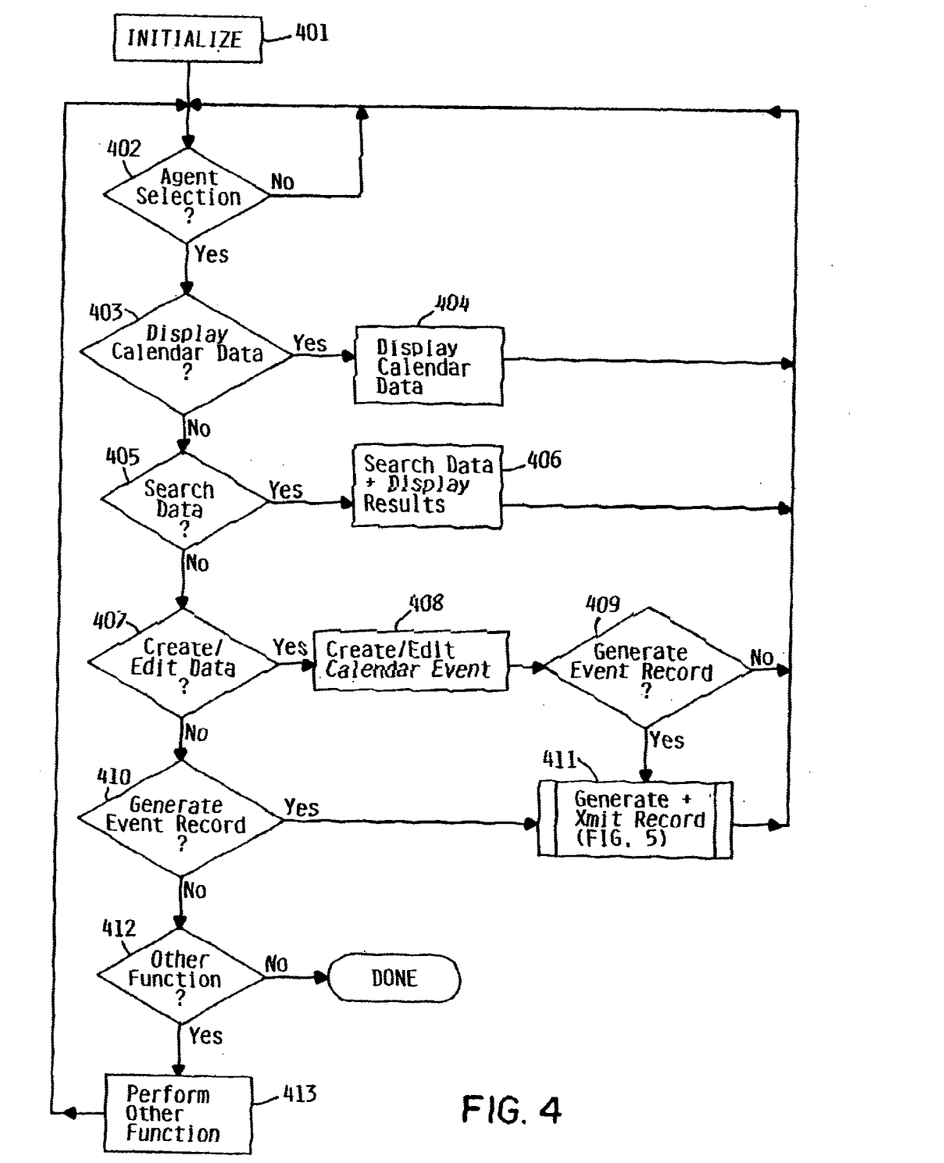
FIG. 4 is a high-level flow diagram of the operation of a service provider scheduling application, according to the preferred embodiment.

FIG. 4 is a high-level flow diagram of the operation of scheduling application 202, according to the preferred embodiment. Scheduling application 202 is typically an interactive application program which presents a service provider agent with a menu of choices, and allows the agent to select various functions related to scheduling or other matters. As shown in FIG. 4, upon being invoked by the service provider's agent, scheduling application 202 initializes (step 401), whereby it presents the agent with a main menu of choices, and waits in a loop (at step 402) for the agent to make an appropriate selection. Typically, scheduling application would use any of various well-known graphical user interfaces, in which a service provider agent makes a selection from a tool bar, menu bar, buttons, list of choices, or the like, by clicking on an appropriate choice with an interactive pointing device, such as a mouse. However, the exact manner of making the choice could vary, e.g., the agent may be required to make a choice by entering a textual command. When a choice has been made, the "Y" branch from step 402 is taken to perform the appropriate action.

Various actions may be selected by the service provider agent, only some of which are shown for illustrative purposes in FIG. 4, it being understood that other actions could be performed. It should also be understood that these are representative actions which may be provided by a typical application, but that it is not essential that an application provide all such actions. For example, depending on the environment and other factors, a calendar application might have no search capability.

If the agent selects a display calendar action (step 403), the scheduling application will retrieve desired calendar information from calendar database 212 or other databases as necessary, and display this information on display 111 (step 404). Information may be, e.g., calendar entries relating to a particular client of the service provider, calendar entries relating to service provider operations in general (e.g., hours of operation or standard times for providing particular types of service), calendar entries relating to a particular employee or other agent of the service provider, calendar entries relating to a particular resource (e.g., the reservation schedule for a particular book, room, or piece of equipment), or some other information. Thus, while displaying information is shown at a high level as step 404, it should be understood that this step may require additional interactive input from the agent to display the desired calendar information.

If the agent selects a search data action (step 405), the scheduling application will search one or more databases such as calendar data 212, client data 211, or database A or B 213, 214, for data matching the search criteria, and will display the search results (step 406). For example, an agent working in a library may wish to see a list of clients having overdue books beyond a specified length of time. An agent of a health care provider may wish to see a list of clients who have visited the provider within a specified time window for a particular procedure or symptom. As in the case of display data, there may be considerable interactive input required from the agent to specify search criteria and formatting of output.

If the agent selects a create or edit calendar data action (step 407), scheduling application 202 solicits input from the agent for creating a new calendar event or editing an existing calendar event (step 408). For this purpose, data may be entered manually or by other means. The scheduling application may access information in calendar data 212 or other databases when creating or editing the calendar event.

For example, in the case of an agent of a library checking out a book on behalf of a library client, the agent will typically creating a calendar event recording that the book has been checked out, and the due date for its return. As is known in the art, it is common to input an identifier identifying the book by reading a bar code, magnetic stripe, or the like. However, it would also be possible to manually enter identifying information. In response to this information, the scheduling application will obtain information from a database concerning borrowing parameters, e.g., how long the book may normally be borrowed, whether there are any "holds" on the book, and so forth. The agent will also enter information identifying the client who wishes to borrow the book; again, this may be done by automatic means, such as reading a magnetic stripe on a borrower's card, or manually. With all this and possibly additional information, scheduling application creates a calendar event entry in calendar database 212, which identifies the book being borrowed, the borrower, and the due date for its return, and possibly additional information.

As a second example, in the case of a health care provider, the provider's agent schedules an appointment for a follow-up visit by the client. The agent enters any needed information, such as the name of the client, the name of the health care professional to be visited, and any special procedures to be performed or resources needed. In response to the entry of this information, the scheduling application may access databases to determine whether any conflicts exist, whether any special instructions should be given the client, and so forth. The scheduling application generates one or more calendar events recording the necessary information in calendar data 212. It may be necessary to generate multiple entries, e.g., for the client's record, for the health care professional, for special equipment, and so forth.

After generating or editing a calendar event, the agent is preferably given the option of generating an electronic calendar event record for use by the client, indicated as step 409. The agent may alternatively select the option to generate an electronic event record from the available actions without performing the step of creating or editing a calendar event, which is illustrated in FIG. 4 as step 410. In either case, if this option is selected, event record generation function 205 generates an appropriate record, shown in FIG. 4 as step 411, and described in greater detail below and in FIG. 5.

If none of the above functions is selected (the "N" branch from step 410), the agent either selects some other function not shown (the "Y" branch from step 412), in which case the scheduling application performs the appropriate selected function (step 413), or exits from the application (the "N" branch from step 412).

Figure 5:
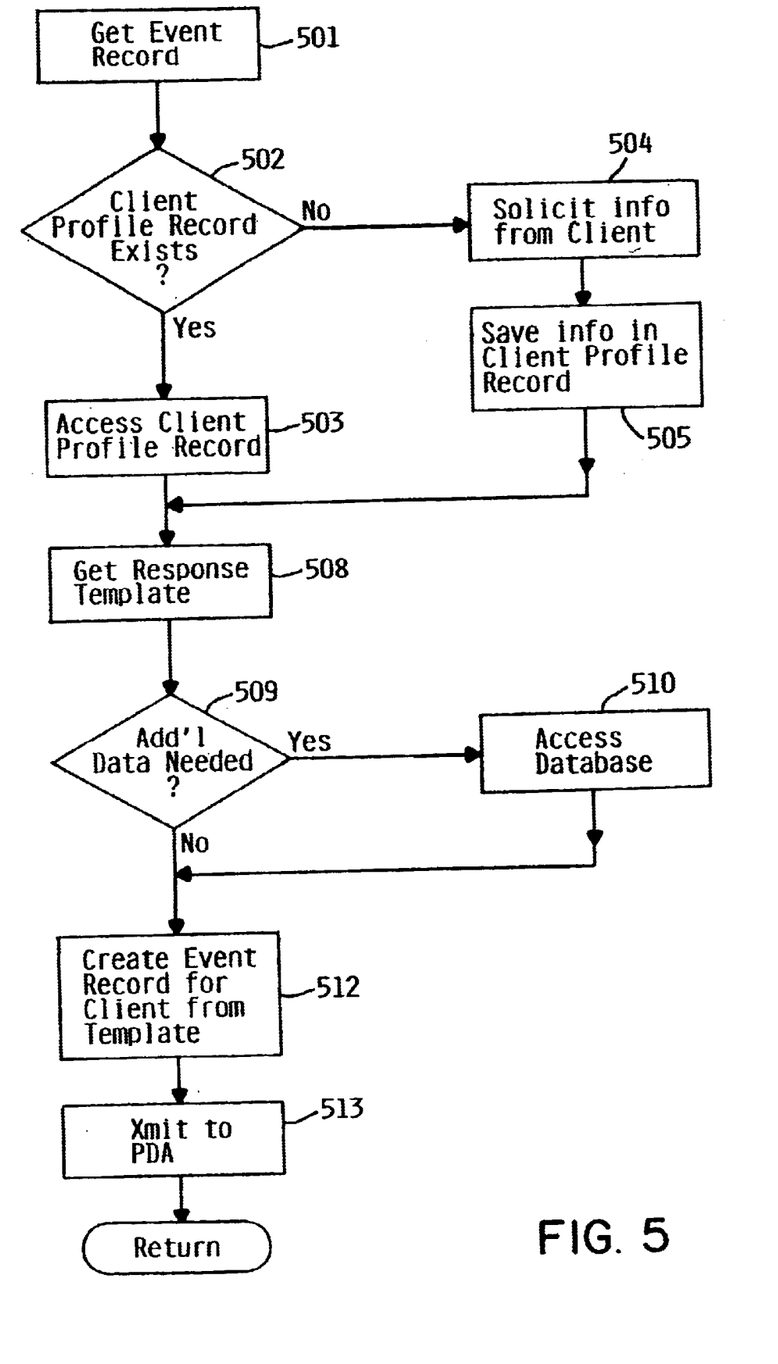
FIG. 5 illustrates in greater detail the process of automatically generating and transmitting an event record to the portable digital device of the client, according to the preferred embodiment.

FIG. 5 illustrates in greater detail the process of automatically generating and transmitting an event record to the portable digital device of the client, which is depicted as step 411 in FIG. 4. Upon being called, event record generation function 205 obtains the event record for the event under consideration from calendar database 212 in the form used by the service provider for its own business operations (step 501).

Generation function 205 then determines whether a client profile record for the client under consideration exists in client database 211. Preferably, calendar event records stored in database 212 contain client identifiers, identifying the client to which each respective event pertains. This identity could be, e.g., a client number, a text name, or a pointer to an entry in client database 211. Preferably, from this client identifier it is possible to automatically access the corresponding entry (client profile record) in client database 211, through any of various database access mechanisms known in the art. However, generation function 205 could alternatively prompt the agent to input a client identifier.

If a client record exists in database 211, and contains the necessary information, the "Y" branch is taken from step 502. In this case, the client profile record is accessed, and the information required for building an event record to be transmitted to the client is taken from the client profile record thus accessed (step 503). If a client record does not exist in database 211, or if a record exists but it does not contain information needed for generating the event record to be transmitted to the client, the "N" branch is taken from step 502. In this case, the necessary information is interactively solicited from the service provider's agent (step 504). The information is then preferably saved in the client profile record (step 505), so that it is not necessary to manually input the information in the future.

Figure 6:
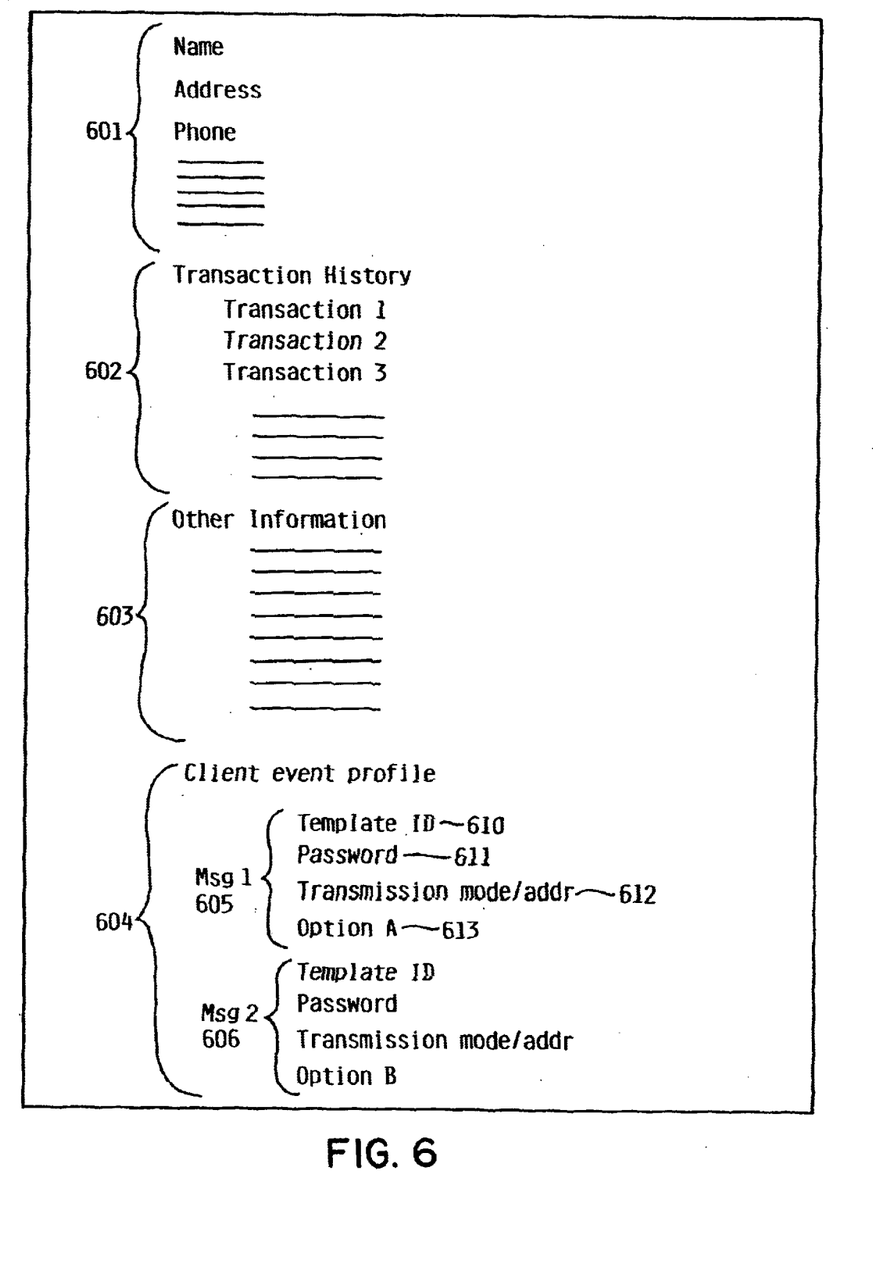
FIG. 6 is a conceptual depiction of the information contained in a typical client profile record, in accordance with the preferred embodiment.

FIG. 6 is a conceptual depiction of the type of information contained in a typical client profile record, in accordance with the preferred embodiment. As shown in FIG. 6, a client profile record will typically contain personal information 601, transaction information 602, other information 603, and calendar event profile 604. Personal information includes such items as name, address, telephone number, social security number, birth date, etc., it being understood that the depth of personal information maintained in database 211 will vary greatly depending on the needs of the service provider. For example, a public library's database may contain nothing more than a name, address and telephone number, while a doctor's office will typically contain much more detailed and personal information. Transaction information 602 contains a listing of prior transactions between the service provider and the client. For many service providers, this may be nothing more than a listing of dates, amounts charged, and amounts received for services. In other cases, more detailed transaction information may be kept, such as descriptions of service. Other information 603 may include any additional information of use to the service provider's operations and particular to the client. For example, a health care provider may include doctor's notes concerning diagnoses and future treatments.

In accordance with the preferred embodiment, the client record also includes calendar event profile information 604, which is used to build a calendar event record for automatic transmission to a portable digital device 303 of the client. Calendar event profile preferably contains a variable number of message sections 605, 606 (two being shown for illustrative purposes in FIG. 6). Each message section specifies the parameters of a single event record to be generated for the client; the client record includes a variable number of message sections to support more than one event record. For example, a client may wish to have one event record for a viewable entry in the electronic calendar application, and a second event record for a reminder message to be brought to the foreground of the portable digital device at a predetermined time. Alternatively, the client may wish to specify multiple destinations for an event record, such as one record to be transmitted to the client's e-mail account on the Internet, while another is transmitted directly to a portable digital device.

Preferably, each message section includes a template identifier 610 specifying a template 220 to be used in constructing and formatting the electronic calendar event, as described further herein. Message section 605 may optionally include a password 611 for the client's portable digital device, which is useful if the client's portable digital device requires a password in order to receive and store a calendar event. As used herein, a password broadly means any collection of data which is used for authorization to access something, whether it is a single string or a combination of data entities, and may include encryption keys, device IDs, user IDs, authorization codes, etc. Message section further includes a transmission mode and address specifier 612, which specifies the form and address of transmission to the client. For example, specifier 612 may specify transmission over a local infrared link; it may specify transmission over a telephone line to a particular number; it may specify transmission over the Internet to a particular e-mail address; etc. Message section 605 may include additional options 613 appropriate to the types of calendar events being generated. For example, there may be an option to set all reminders at a prespecified time before the event in question, as, e.g. reminding a library patron to return a book one day before it is due.

The client profile record has been described herein and shown in FIG. 6 in functional terms. It should be understood that FIG. 6 is not intended to represent a particular data formatting, and the actual format of data records could vary considerably. In particular, it is likely that complex data records be maintained as multiple records of various sizes which might be linked by pointers or other indices, as is commonly known in the database art.

Returning now to FIG. 5, after accessing the information in a client profile record (step 503) or obtaining the information directly from the client (step 504) and saving it (step 505), the generation function retrieves the template 220 specified in template identifier field 610 of the client profile record (step 508). This template specifies the formatting of the event record to be generated.

The template may specify additional data to be retrieved. For example, the template may contain an area reserved for an advertisement, the actual data or graphics to be placed in this area to vary from time to time (or even from client to client), and to be retrieved from another database. In the alternative, and in particular in the case of a health care professional, the template may contain an area reserved for special instructions for a medical procedure be performed at a forthcoming visit by the client; in this case, the medical procedure is specified in the service provider's event record which was retrieved in step 501, and with this information the instructions are retrieved from a database of instructions to be given clients. If the template specifies additional data needed (i.e., beyond that already contained in the template, the client profile record, and the service provider's own event record), the "Y" branch is taken from step 509, and the specified data is retrieved from an appropriate database or databases (step 510).

The event record to be transmitted to the client is then constructed using template 220 (step 512). The event record is then transmitted to the client using the transmission means specified in transmission field 612 of the client profile record (step 513).

Figure 7:
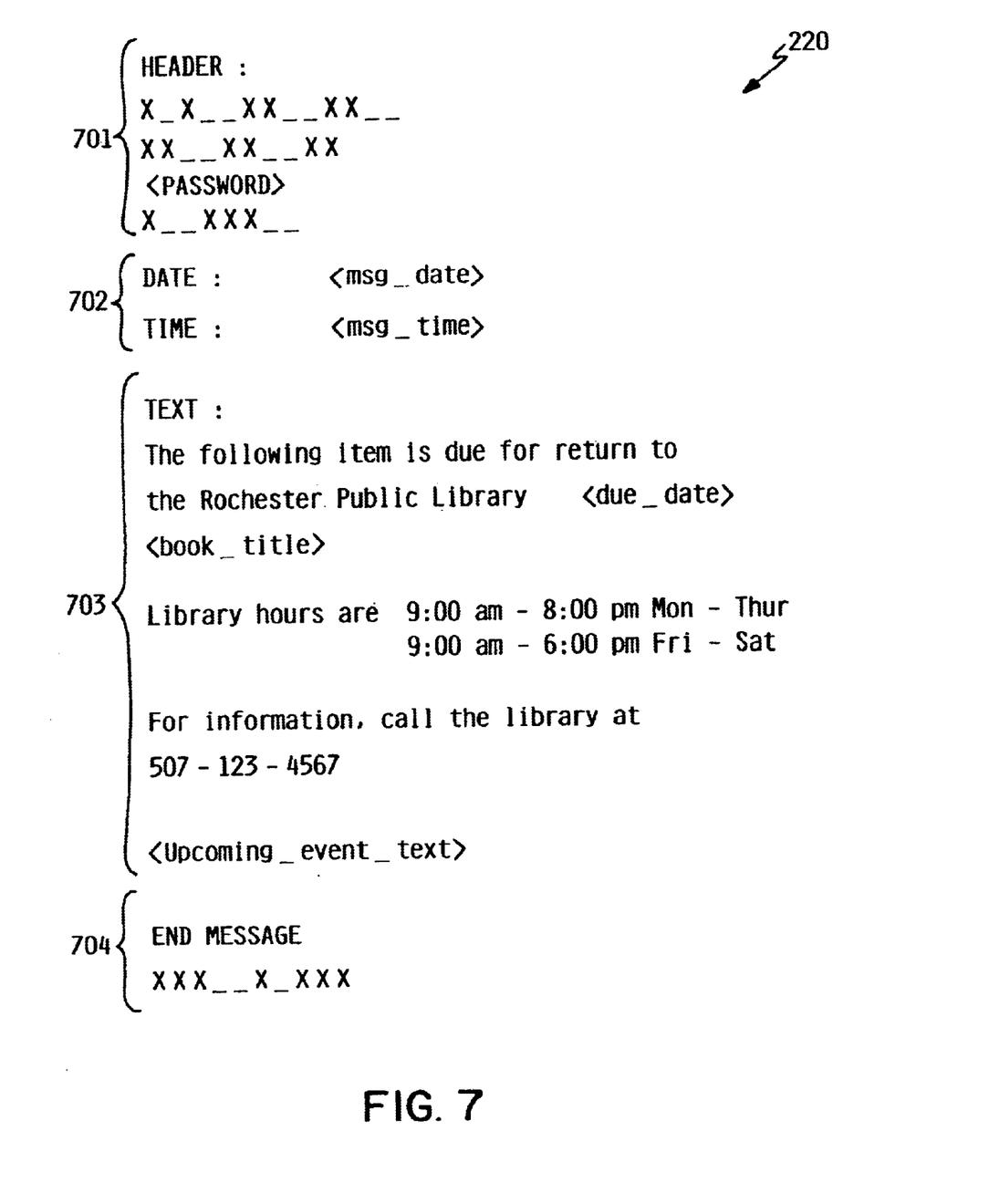
FIG. 7 is an example of a template for constructing an event record to be transmitted to a client, according to the preferred embodiment.

The template can be visualized as a form which serves as a base for the event record, containing various blanks which are "filled in" by generation function 205 using data in the service provider's event record, the client profile record, or elsewhere. FIG. 7 is an example of a template 220, such as might be used by a public library to remind a client that a book is due on a particular date. A template contains a header portion 701, a date and time 702, a body 703, and a trailer 704 indicating the end of the transmission. The header 701 is in a format for recognition by the portable digital device of the client, and tells the client's portable digital device what type of transmission it is (i.e., that it is a transmission to be recorded as a calendar event of a particular type; in the example of FIG. 7, the template is for a reminder notice to be added to a list of reminder notices, and to be called to the client's attention at a specified date and time). The header may optionally include a password from the client's profile record password field 611. The password authorizes the portable digital device to store the incoming transmission as a calendar event in its internal database. The date and time 702 indicate a date and time of the calendar event. These are derived from the service provider's event record, although they are not necessarily the same as the date recorded in the service provider's record. In the example of FIG. 7, a date for a message is computed from the due date of a book (from the service provider's event record) by subtracting a lead time specified as an option in an option field 613 of the client profile record. The body 703 is the message to be given the client at the specified date and time, or to be displayed on a calendar in an appropriate date box, listed in a chronology of events, or the like. The body may include standard text which is the same for all clients, and variable text which varies with the individual client or transaction. In the example of FIG. 7, the body includes a due date for return of a borrowed item, and a title of the borrowed item, which are of course variable fields obtained from the service provider's event record. The body contains additional information, such as library hours and telephone, which the client may find useful. Finally, in this example, the body contains an upcoming events entry, for advertising upcoming events related to the library. The event generation function 205 accesses a database of upcoming events, and places the text of the announcement in the event record to be transmitted to the client. For example, a special film may be shown, an author may make an appearance, or there may be a reading of stories for children. It would even be possible to classify different types of special events of interest to particular clients, and choose one appropriate to the client receiving the message. For example, the client personal data may record whether the client has small children, in which case a reading of children's stories may be of interest.

In the preferred embodiment, a client database contains certain client-specific information for generating an electronic event record for transmission to the portable digital device of a client. As described above, this information can also be manually solicited from the client. It would alternatively be possible to input this information into the service provider computer by other means. For example, the client's portable digital device could itself transmit information regarding client preferences, including template information, from which the service provider's computer could construct an appropriate record for transmission. As an additional alternative, the information could be stored on a magnetic stripe, a smart card, or a similar portable data storage, which the client carries with him. Finally, it is possible that no client specific information would be required, a circumstance which would be more likely if, in the future, a standard interface for portable digital devices is recognized, so that information specific to a client's device (e.g., contained in the template header) is no longer necessary.

In the preferred embodiment, event records for transmission to clients are generated from templates. Templates are used in the preferred embodiment for flexibility in supporting different types of portable digital devices. However, it will be understood that a template is simply an easily maintainable form for generating different types of records, and that the same result could be obtained by the use of computer programming code, along with other data structures such as tables and the like. Furthermore, if a standard interface for portable digital devices is recognized, the need for multiple templates is diminished, making the expression of a record format in programming code statements a more attractive alternative.

In the preferred embodiment as described above, a service provider generates calendar event records for its clients from its own data and transmits these to the clients' personal digital devices. While the invention has thus far been described with respect to calendar event records, it will be appreciated that the methods and apparatus described herein could apply to certain other forms of data as well. I.e, the mere absence of date and time indicia in data records would not necessarily make the methods and apparatus described herein inapplicable or inappropriate, and there may be similar or analogous instances in which these methods and apparatus could be applied to the construction of data records, without date/time indicia, which are nevertheless individualized in some respect for use by particular clients, from on-line data used for service provider operations.

Although a specific embodiment of the invention has been disclosed along with certain alternatives, it will be recognized by those skilled in the art that additional variations in form and detail may be made within the scope of the following claims:

What is claimed is:

1. A method for recording calendar events, comprising the steps of:
   maintaining service provider data for operation of a service provider in a service provider computer system, said service provider providing services to a plurality of clients, said services being other than data processing services;
   automatically generating a calendar event record for a client of said service provider from said service provider data, said automatically generating step being performed by said service provider computer system, said calendar event record being formatted for use by a portable digital device of said client, said calendar event record containing information of a calendar event relating to said services provided by said service provider to said client; and
   transmitting said calendar event record directly from said service provider computer system to said portable digital device.

2. The method for recording calendar events of claim 1, wherein said transmitting step comprises transmitting said calendar event record over an infrared transmission frequency.

3. The method for recording calendar events of claim 1, wherein said step of automatically generating a calendar event record for a client comprises:
   accessing client specific data in said service provider computer system, said client specific data including formatting information for specifying content of said calendar event record; and
   generating said calendar event record in accordance with said formatting information contained in said client specific data.

4. The method for recording calendar events of claim 3, wherein said client specific data includes data specifying a form of transmission of said calendar event record to said portable digital device.

5. The method for recording calendar events of claim 3, wherein said client specific data includes data specifying a template to be used for formatting said calendar event record.

6. The method for recording calendar events of claim 3, wherein said client specific data includes data specifying a password for access to said portable digital device.

7. The method for recording calendar events of claim 1, wherein said service provider is a library.

8. The method for recording calendar events of claim 1, wherein said service provider is a health care provider.

9. The method for recording calendar events of claim 1, wherein said calendar event record generated by said service provider includes instructions for said client relating to said calendar event, said instructions being retrieved from a database of instructions in said service provider computer system.

10. The method for recording calendar events of claim 1, wherein said calendar event record generated by said service provider includes an advertisement, said advertisement being retrieved from a database of advertisements in said service provider computer system.

11. A computer program product for constructing and transmitting calendar event records, said computer program product comprising a plurality of computer executable instructions recorded on signal-bearing media, wherein said instructions, when executed by a computer of a service provider, cause the computer to perform the steps of:
   maintaining service provider data for operation of said service provider in said service provider computer system, said service provider providing services to a plurality of clients, said services being other than data processing services;
   automatically generating a calendar event record for a client of said service provider from said service provider data, said automatically generating step being performed by said service provider computer system, said calendar event record being formatted for use by a portable digital device of said client, said calendar event record containing information of a calendar event relating to said services provided by said service provider to said client; and
   transmitting said calendar event record directly from said service provider computer system to said portable digital device.

12. The computer program product of claim 11, wherein said transmitting step comprises transmitting said calendar event record over an infrared transmission frequency.

13. The computer program product of claim 11, wherein said step of automatically generating a calendar event record for a client comprises:
   accessing client specific data in said service provider computer system, said client specific data including formatting information for specifying content of said calendar event record; and
   generating said calendar event record in accordance with said formatting information contained in said client specific data.

14. The computer program product of claim 13, wherein said client specific data includes data specifying a form of transmission of said calendar event record to said portable digital device.

15. The computer program product of claim 13, wherein said client specific data includes data specifying a template to be used for formatting said calendar event record.

16. The computer program product of claim 13, wherein said client specific data includes data specifying a password for access to said portable digital device.

17. A computer system for managing calendar information for a service provider, comprising:

a programmable processor;

a memory for storing data and instructions executable on said programmable processor;

at least one interactive data terminal for receiving data from and displaying data to an agent of said service provider;

a calendar application embodied as a plurality of instructions executable on said programmable processor, said calendar application maintaining calendar data for operation of said service provider, said service provide providing services to a plurality of clients, said services being other than data processing services;

a client event record generation function embodied as a plurality of instructions executable on said programmable processor, said client event record generation function automatically generating a calendar event record for a client of said service provider using said calendar data, said calendar event record being formatted for use by a portable digital device of said client, said calendar event record containing information of a calendar event relating to said services provided by said service provider to said client; and an interface for transmitting said calendar event record from said computer system to said portable digital device.

18. The computer system of claim 17, further comprising a database of client specific data, said client specific data including formatting information specifying the content of calendar event records generated by said client event record generation function.

19. A method for providing data to a portable digital device of a client of a service provider, said service provider providing services to a plurality of clients, said method comprising the steps of:

maintaining service provider data for use in the provision of services by said service provider to said plurality of clients of said service provider, said services being other than data processing services, said service provider data being maintained in a computer system of said service provider, said service provider data including client specific data for each respective one of a plurality of clients of said service provider;

automatically generating an individualized data record for a first client of said service provider from said service provider data, at least some of said individualized data record being generated using client specific data corresponding to said first client, said automatically generating step being performed by said service provider computer system, said individualized data record being formatted for use by a portable digital device of said first client, said individualized data record containing information relating to said services provided by said service provider to said first client; and transmitting said individualized data record directly from said service provider computer system to said portable digital device.

* * * * *